(No Model.) 2 Sheets—Sheet 1.

R. HILL.
BUTTER DISH.

No. 519,125. Patented May 1, 1894.

Witnesses,
J. H. Shumway
Lillian D. Kelsey

Rowland Hill
Inventor
By Attys
Earle Seymour

THE NATIONAL LITHOGRAPHING COMPANY,
WASHINGTON, D. C.

(No Model.)  2 Sheets—Sheet 2.

R. HILL.
BUTTER DISH.

No. 519,125. Patented May 1, 1894.

Witnesses:
J. H. Shumway
Lillian D. Kelsey

Rowland Hill
Inventor
By Atty's
Earle Seymour

UNITED STATES PATENT OFFICE.

ROWLAND HILL, OF MERIDEN, CONNECTICUT.

BUTTER-DISH.

SPECIFICATION forming part of Letters Patent No. 519,125, dated May 1, 1894.

Application filed February 21, 1894. Serial No. 500,971. (No model.)

*To all whom it may concern:*

Be it known that I, ROWLAND HILL, of Meriden, in the county of New Haven and State of Connecticut, have invented a new Improvement in Butter-Dishes; and I do hereby declare the following, when taken in connection with accompanying drawings and the letters of reference marked thereon, to be a full, clear, and exact description of the same, and which said drawings constitute part of this specification, and represent, in—

Figure 1:
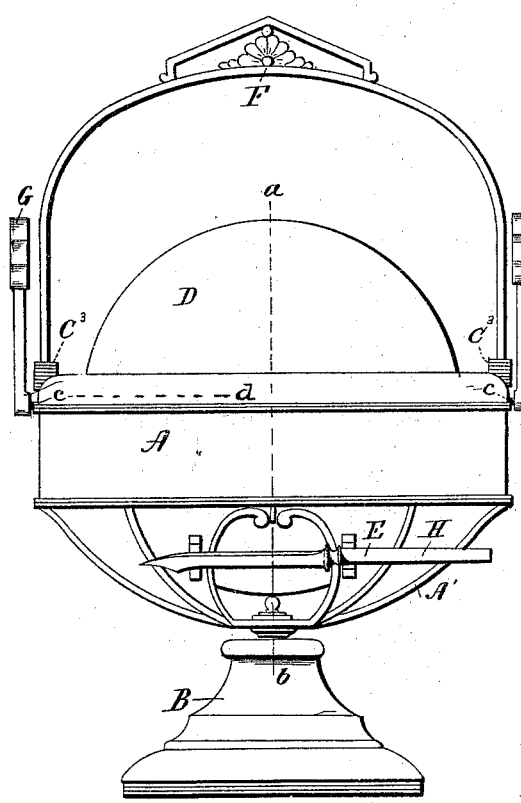
Figure 2:
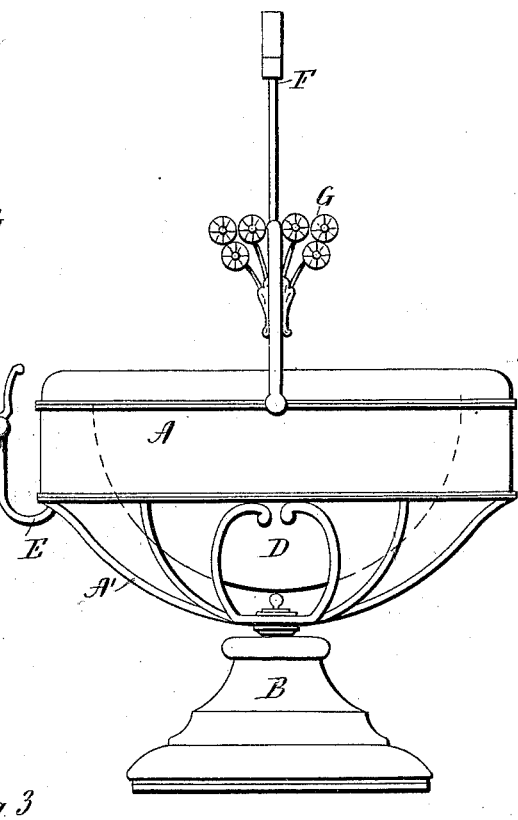
Figure 3:
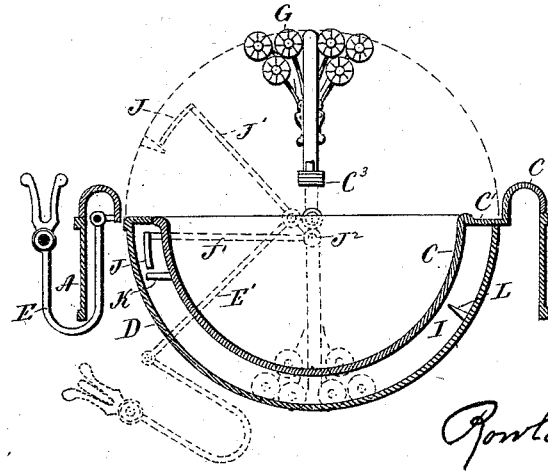
Figure 4:
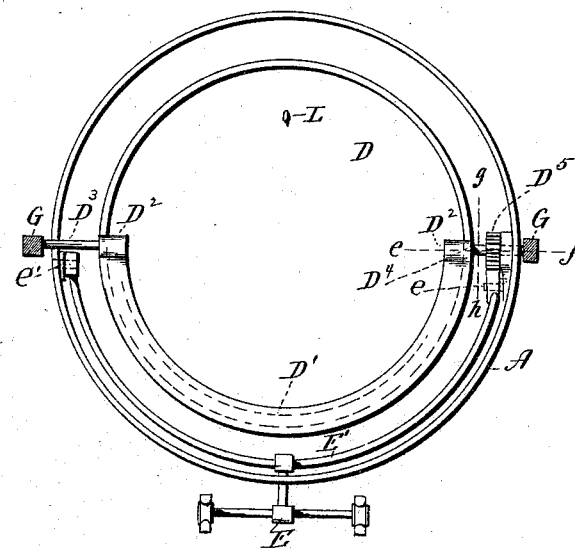
Figure 7:
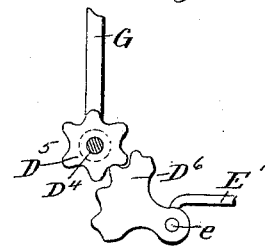
Figure 6:
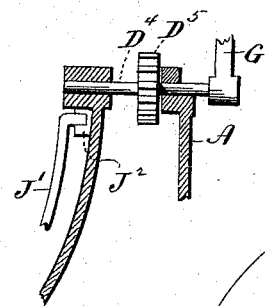
Figure 5:
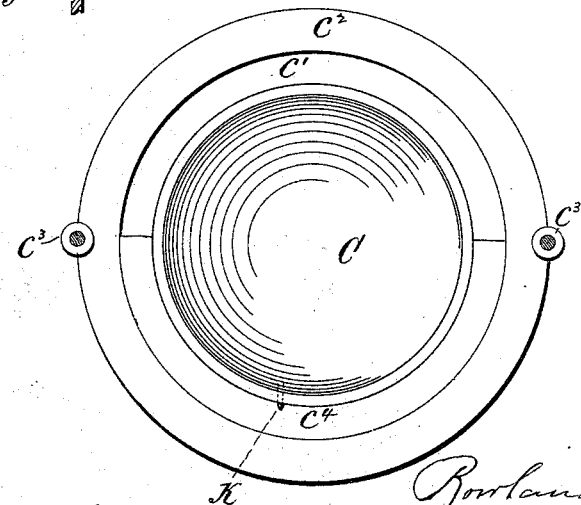

Figure 1, a view in front elevation of one form which a butter-dish constructed in accordance with my invention may assume, the cover being shown in its closed position; Fig. 2, a view of the device in side elevation with the cover in its open position; Fig. 3, a broken view of the device in vertical central section on the line $a$—$b$ of Fig. 1; Fig. 4, a view of the device in horizontal section on the line $c$—$d$ of Fig. 1, with the butter receptacle removed; Fig. 5, a detached plan view of the butter receptacle with the handle, which is connected with it, broken away; Fig. 6, an enlarged view in vertical section on the line $e$—$f$ of Fig. 4; Fig. 7, a view in vertical section on the line $g$—$h$ of Fig. 4, showing the geared connection between the bail of the knife-holder and the swinging cover.

My invention relates to an improvement in that class of butter-dishes having swinging covers, controlled in covering and uncovering the butter by the weight of the butter-knife acting as a counter-weight, the object being to produce a simple and convenient device, not liable to derangement, and of attractive appearance.

With these ends in view, my invention consists in a butter-dish having certain details of construction and combinations of parts as will be hereinafter described and pointed out in the claims.

As herein shown, the device comprises a frame composed of a frame-ring A, and frame-arms A', a standard B, upon which the frame is swiveled to turn in a horizontal plane, a butter-receptacle C, a swiveled cover D, a knife-holder E, a handle F, and several other adjuncts as will be pointed out later on.

The swiveled cover D, which is hemispherical in form, is provided upon its upper edge with a semi-circular inwardly projecting flange D', which weights the said edge, the ends of the said flange being enlarged to form boxes $D^2 D^2$, receiving the inner ends of oppositely projecting trunnions $D^3 D^4$ which have bearing at their outer ends at opposite points in the upper edge of the frame-ring A, as shown in Fig. 4 of the drawings. Corresponding reversing weights G G are applied to the projecting ends of the trunnions so that when the cover is in its retired or open position, the weights extend vertically upward, while on the other hand, when the cover is in its inverted or closed position, the weights extend vertically downward. These weights assist in reversing the cover, or turning it into its closed position, and for that reason I have chosen to speak of them as reversing weights. As herein shown they are of a conventional floral pattern, but their form may be varied as desired. The trunnion $D^4$ before mentioned, is provided at a point midway of its length and within the frame-ring A, with a small pinion $D^5$, which is engaged by a segmental toothed rack $D^6$, secured to one end of the bail E' of the knife-holder E, the ends of the said bail being pivotally connected with the inner face of the frame ring A by means of inwardly projecting studs $e\ e'$ as shown in Fig. 4, the stud $e$ extending into the segment with which the adjacent end of the bail is rigidly connected. The said rack $D^6$ is engaged with the pinion $D^5$, so that when the cover is in its open position, the holder will be in its elevated position, and vice-versa. Therefore when the butter-knife H, which may be of any approved style and construction, and which acts as a counter-weight, is placed in the knife-holder, it will move the same into its depressed position, and through the medium of the rack and pinion, cause the cover to be turned into its closed or inverted position. The butter-dish or receptacle C, is also hemi-spherical in form, but enough smaller in diameter than the cover D with which it is concentric, to form a weight-chamber I between them when the cover is in its open position, as shown in Fig. 3 of the drawings. The said receptacle C is constructed at its upper edge with a wide horizontal flange C', which connects it with a heavy curved rim $C^2$, the edge of which rests upon the upper edge of the frame-ring A, as clearly shown in the drawings, said rim being cut away at opposite points as at $c$ $c'$, as seen in Fig. 1, to fit down over the trunions $D^3$ $D^4$ of the swinging cover. Directly above these points where the rim is cut away, as set forth, it is provided with two ornamental bosses $C^3$ $C^3$, located opposite each other, and adapted to receive the lower ends of the handle F, which is thereby rigidly connected through the rim and flange $C'$, with the butter receptacle C, whereby the same may be readily removed from and restored to the device by means of the handle. The flange $C'$ before mentioned, is cut away to form a semi-circular opening $C^4$, adapted in width to receive the semi-circular flange $D'$ formed upon one edge of the cover as already mentioned. When the receptacle C is in place, and the cover is in its open position, the flange $D'$ occupies the opening or space $C^4$, and thus virtually forms a continuation of the flange $C'$. When, however, the cover is in its closed position, the flange $D'$ rests upon the flange $C'$ and acts as a weight in holding the cover in that position. To overcome the weight of the said flange $D'$ and to start the cover in swinging back to its open position after the butter-knife H has been removed from the holder E, I employ a counter-balance weight J, which is located a part of the time in the chamber I, and which is secured to a semi-circular bail $J'$, the ends of which enter bearings $J^2$, located beneath the boxes $D^2$ $D^2$, and shown in Figs. 3 and 5 of the drawings. This weight is normally supported in an elevated position by means of a pin K, projecting outwardly from the receptacle C, and located below the edge, but above the vertical center thereof, as seen in Fig. 3 of the drawings. The cover, on the other hand, is provided with an inwardly projecting pin L, which, as will be seen by comparing Figs. 4 and 5 of the drawings, is located out of line with the pin K, and so as to clear the same when the cover is swung into its closed position, and which, as seen by Fig. 3 of the drawings, is located below the opposite edge of the cover from the said pin K. When therefore the cover is swung from its closed into its open position, the pin L will pass the pin K, and engage with the lower edge of the weight J, and lift the same into the position in which it is shown by broken lines in Fig. 3. In this position the weight exerts a constant effort to reverse the cover and turn it back into its open position, but is effectually resisted by the heavy flange $D'$ of the cover tending to keep it in its closed position, and by the weight of the butter-knife, which at this time holds the knife-holder in its depressed position, as shown by broken lines in the said figure. When, however, the butter-knife is removed from the knife-holder, the weight J will overcome the weight of the flange $D'$, and the reversing weights G, and start the cover in opening, at which time the reversing weights, as well as the knife-holder, will begin to go back to their elevated positions.

As the cover swings back into its closed position, the counter-balance weight J drops back into engagement with the pin K of the receptacle C, and furnishes the cover no further assistance, but by this time the flange $D'$ has passed the vertical, after which its weight is sufficient to complete the work of elevating the reversing weights and the holder, and of closing the cover. It will thus be seen that by placing the butter-knife in the butter-knife-holder, the same will descend and effect the closing of the cover, and that by removing the butter-knife from its holder, the equilibrium of the several parts of the device will be so destroyed that the cover will immediately swing into its open position and so expose the butter in the dish for use.

It will be understood of course, that the several parts described are proportioned in weight so that they respond quickly to the knife when it is placed in or removed from the knife-holder of the device.

It is apparent that in carrying out my invention some changes in the construction herein shown and described may be made, and I would therefore have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. In a butter-dish, the combination with the frame thereof, of a cover swiveled therein, reversing weights connected with the said cover and extending vertically upward when the same is in its open position, and vertically downward when the same is in its closed position, a knife-holder having geared connection with the said cover, whereby the cover is swung into its closed position when the knife-holder is depressed, and whereby the knife-holder is restored to its elevated position when the cover is swung into its open position, a butter-receptacle smaller in diameter than the cover with which it is concentric, and a counter-weight located in the chamber formed between the butter receptacle and cover, pivotally connected with the latter, supported in an elevated position by the cover when the same is closed so as to start the same in opening when the knife is removed from the knife-holder and the equilibrium of the parts thus destroyed, substantially as described.

2. In a butter-dish, the combination with the frame thereof, of a cover swiveled therein and provided upon its upper edge with an inwardly projecting semi-circular flange forming a weight, reversing weights connected with the said cover, and extending vertically upward when the same is in its open position, and vertically downward when the same is in its closed position, a knife-holder carried by a bail, the inner ends of which have pivotal connection with the said frame, and which has geared connection with the swinging cover, whereby the cover is swung into its closed position when the knife-holder is depressed, and whereby the knife-holder is restored to its elevated position when the cover is swung into its open position, a butter receptacle smaller in diameter than the cover with which it is concentric, and constructed at its upper edge with a horizontal flange cut away to receive the semi-circular inwardly projecting flange of the cover, and with a rim which rests upon the frame, a counter-weight located in the chamber formed between the butter receptacle and cover, pivotally connected with the latter, and supported in an elevated position by the cover when the same is closed so as to start the same in opening when the knife is removed from the knife holder and the equilibrium of the parts thus destroyed, substantially as described.

In testimony whereof I have signed this specification in the presence of two subscribing witnesses.

ROWLAND HILL.

Witnesses:
WILLIAM W. MOSHER,
GEO. A. CHURCH.